(12) United States Patent
P N et al.

(10) Patent No.: US 11,626,981 B2
(45) Date of Patent: *Apr. 11, 2023

(54) FACILITATING HITLESS SECURITY KEY ROLLOVER USING DATA PLANE FEEDBACK

(71) Applicant: Juniper Networks, Inc., Sunnyvale, CA (US)

(72) Inventors: Guruprasad P N, Bangalore (IN); Sumeet Mundra, Bangalore (IN)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/457,951

(22) Filed: Dec. 7, 2021

(65) Prior Publication Data

US 2022/0094534 A1 Mar. 24, 2022

Related U.S. Application Data

(63) Continuation of application No. 16/907,685, filed on Jun. 22, 2020, now Pat. No. 11,368,294.

(30) Foreign Application Priority Data

May 6, 2020 (IN) .............................. 202041019240

(51) Int. Cl.
*H04L 9/08* (2006.01)

(52) U.S. Cl.
CPC .......... *H04L 9/0847* (2013.01); *H04L 9/0827* (2013.01); *H04L 9/0897* (2013.01)

(58) Field of Classification Search
CPC .... H04L 9/0847; H04L 9/0827; H04L 9/0897
See application file for complete search history.

(56) References Cited

U.S. PATENT DOCUMENTS

| 8,225,084 B2* | 7/2012 | Kudo | H04L 63/061 |
| | | | 713/150 |
| 8,345,881 B2* | 1/2013 | Rekimoto | H04L 63/062 |
| | | | 380/282 |

(Continued)

FOREIGN PATENT DOCUMENTS

| CN | 111049648 A | 4/2020 |
| EP | 2763442 A1 | 8/2014 |
| WO | 2014008923 A1 | 1/2014 |

OTHER PUBLICATIONS

Extended European Search Report for Application No. EP20190620.3, dated Feb. 1, 2021, 10 pages.

*Primary Examiner* — Viral S Lakhia
(74) *Attorney, Agent, or Firm* — Harrity & Harrity, LLP

(57) ABSTRACT

A first network device may install a receiving key for decrypting traffic on protocol hardware associated with a data plane of the first network device. The first network device may receive, from the data plane, a first notification indicating that the receiving key is installed on the protocol hardware and may provide, to a second network device, a first message identifying the receiving key. The first network device may receive, from the second network device, an acknowledgment message indicating that the receiving key is installed on the second network device and may install a transmission key for encrypting traffic on the protocol hardware. The first network device may receive, from the data plane, a second notification indicating that the transmission key is installed on the protocol hardware and may provide, to the second network device, a second message identifying the transmission key.

20 Claims, 16 Drawing Sheets

(56) References Cited

U.S. PATENT DOCUMENTS

| | | | |
|---|---|---|---|
| 8,503,681 B1 | 8/2013 | McGrew et al. | |
| 8,756,439 B1 | 6/2014 | Jannson et al. | |
| 9,847,875 B1 | 12/2017 | Berzin et al. | |
| 9,882,714 B1 | 1/2018 | Cignetti et al. | |
| 9,960,913 B2 * | 5/2018 | Pyka | H04L 63/068 |
| 10,057,056 B2 * | 8/2018 | Guillaume | H04W 12/041 |
| 10,439,804 B2 * | 10/2019 | Zhang | H04L 9/065 |
| 10,520,332 B2 * | 12/2019 | Wenger | G01D 4/002 |
| 10,797,861 B2 * | 10/2020 | Li | G06F 21/645 |
| 10,873,455 B2 * | 12/2020 | Weis | H04L 63/0442 |
| 11,184,366 B1 * | 11/2021 | Berg | H04L 9/0894 |
| 2014/0281546 A1 * | 9/2014 | Doyle | H04L 9/0838 |
| | | | 713/171 |
| 2014/0304500 A1 | 10/2014 | Sun et al. | |
| 2015/0334096 A1 * | 11/2015 | Pyka | H04L 63/068 |
| | | | 713/171 |
| 2016/0134600 A1 | 5/2016 | Sun et al. | |
| 2019/0132120 A1 * | 5/2019 | Zhang | H04L 9/16 |
| 2019/0140826 A1 | 5/2019 | Carrel et al. | |
| 2019/0288842 A1 | 9/2019 | Weis et al. | |
| 2020/0106702 A1 | 4/2020 | Acharya et al. | |
| 2020/0195431 A1 * | 6/2020 | Athmalingam | H04L 9/3239 |
| 2020/0213111 A1 | 7/2020 | Leavy et al. | |
| 2020/0220843 A1 | 7/2020 | Hill et al. | |
| 2020/0358764 A1 | 11/2020 | Hojilla Uy et al. | |
| 2021/0351921 A1 | 11/2021 | P N et al. | |

* cited by examiner

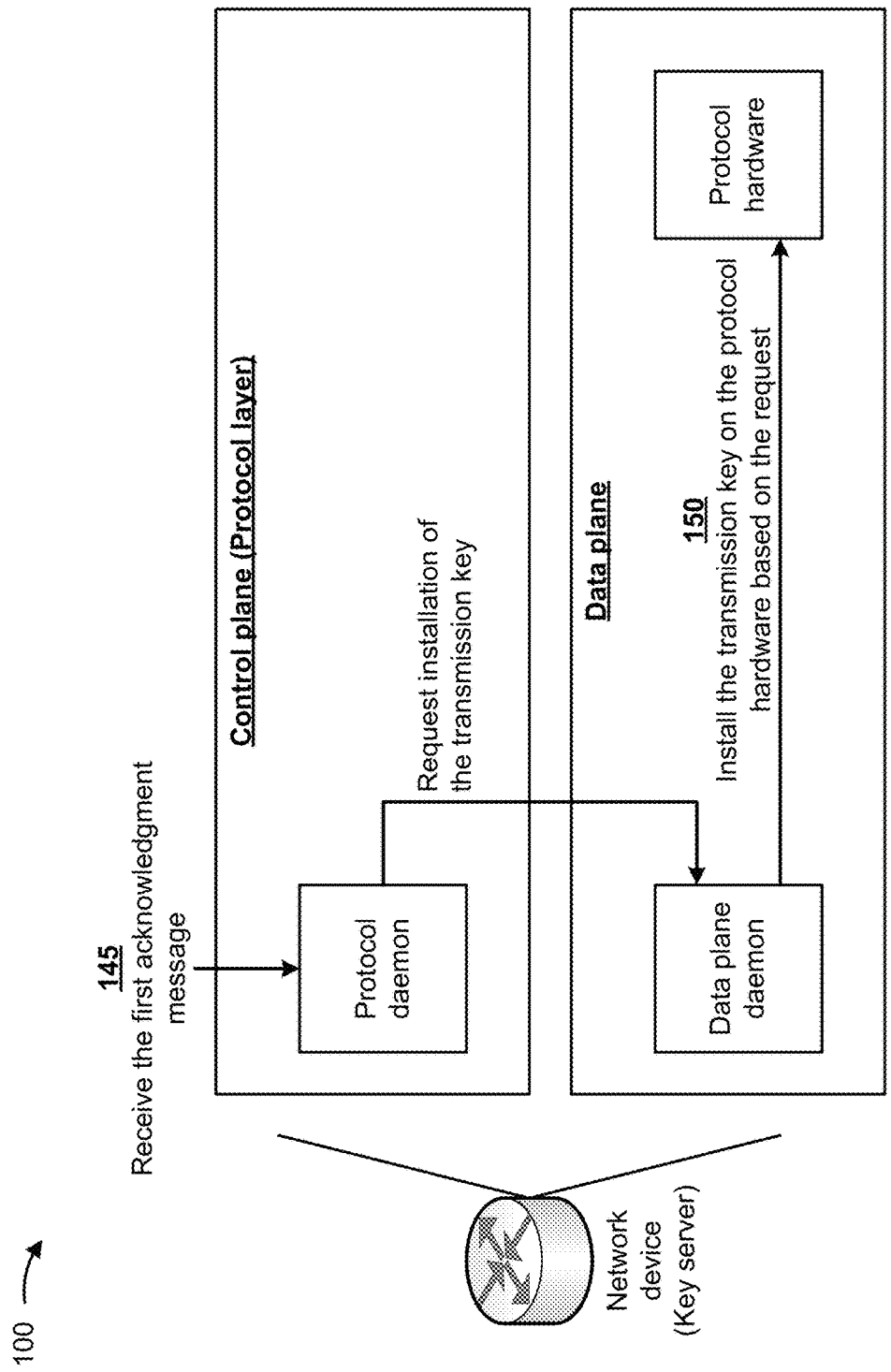

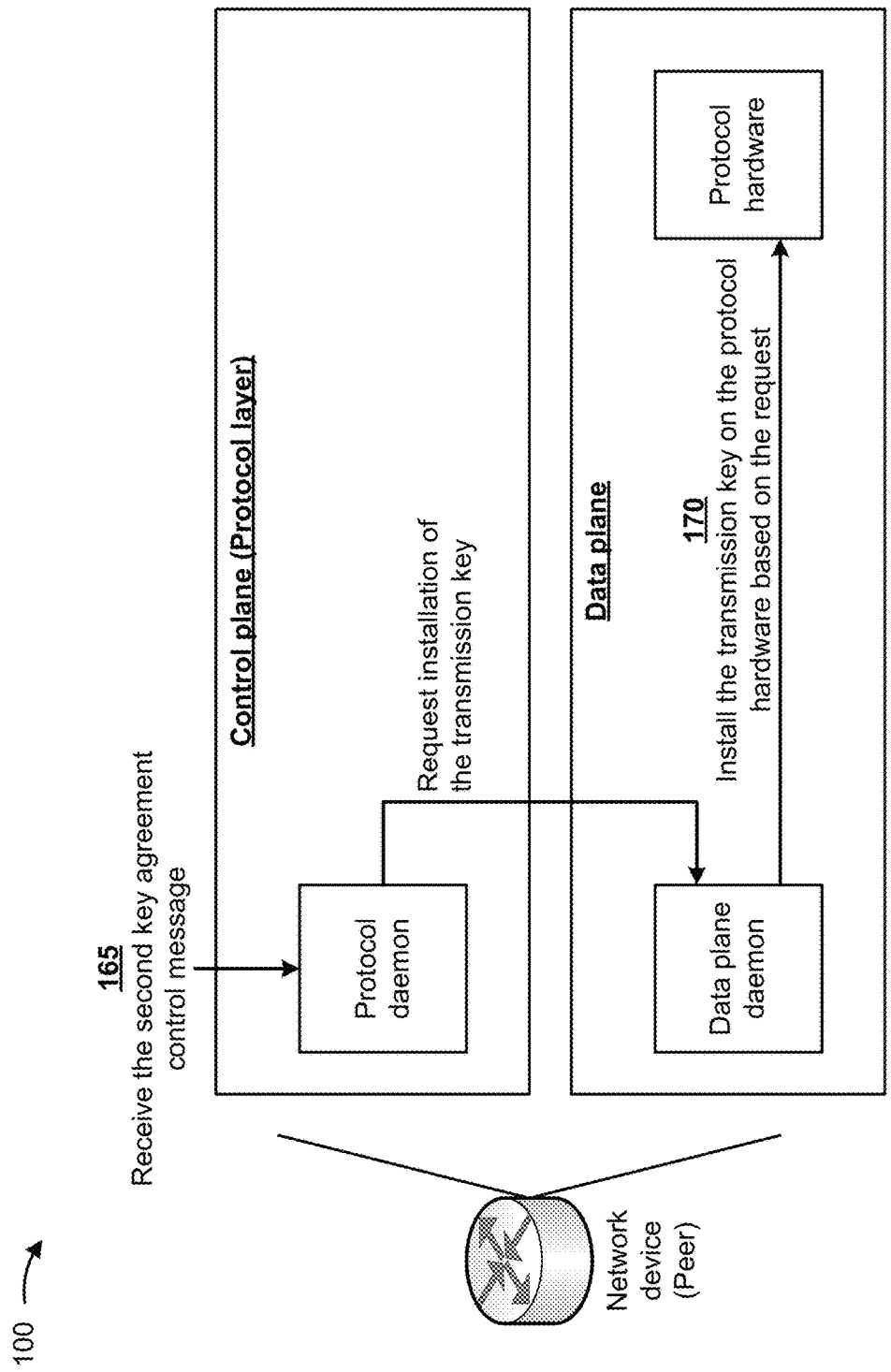

FACILITATING HITLESS SECURITY KEY ROLLOVER USING DATA PLANE FEEDBACK

CROSS-REFERENCE TO RELATED APPLICATIONS

This application is a continuation of U.S. patent application Ser. No. 16/907,685, filed Jun. 22, 2020, which claims priority to India Provisional Application No. 202041019240 entitled "FACILITATING HITLESS SECURITY KEY ROLLOVER," filed on May 6, 2020, which are incorporated herein by reference in their entireties.

BACKGROUND

Media access control security (MACsec) is a security standard, defined by the Institute of Electrical and Electronics Engineers (IEEE) 802.1AE, that defines connectionless data confidentiality and integrity for media access independent protocols. The MACsec standard specifies a set of protocols to meet security requirements for protecting data traversing Ethernet local area networks (LANs). MACsec defines a security infrastructure to provide data confidentiality, data integrity, and data origin authentication.

SUMMARY

According to some implementations, a method may include receiving, by a first network device, encryption data identifying a receiving key for decrypting traffic, and a transmission key for encrypting traffic; installing, by the first network device, the receiving key on protocol hardware associated with a data plane of the first network device; receiving, from the data plane of the first network device, a first notification indicating that the receiving key is installed on the protocol hardware; providing, by the first network device and to a second network device, a first key agreement control message identifying the receiving key, wherein the first key agreement control message is provided based on receiving the first notification; receiving, by the first network device and from the second network device, an acknowledgment message indicating that the receiving key is installed on the second network device; installing, by the first network device, the transmission key on the protocol hardware based on receiving the acknowledgment message; receiving, from the data plane of the first network device, a second notification indicating that the transmission key is installed on the protocol hardware; and providing, by the first network device and to the second network device, a second key agreement control message identifying the transmission key, wherein the second key agreement control message is provided based on receiving the second notification.

According to some implementations, a first network device may include one or more memories and one or more processors to: receive encryption data identifying a first key for decrypting traffic, and a second key for encrypting traffic; install the first key on protocol hardware associated with a data plane of the first network device; receive, from the data plane, a first notification indicating that the first key is installed on the protocol hardware; provide, to a second network device, a first key agreement control message identifying the first key, wherein the first key agreement control message is provided based on receiving the first notification; receive, from the second network device, a first acknowledgment message indicating that the first key is installed on the second network device; install the second key on the protocol hardware based on receiving the first acknowledgment message; receive, from the data plane, a second notification indicating that the second key is installed on the protocol hardware; provide, to the second network device, a second key agreement control message identifying the second key, wherein the second key agreement control message is provided based on receiving the second notification; and receive, from the second network device, a second acknowledgment message indicating that the second key is installed on the second network device.

According to some implementations, a non-transitory computer-readable medium may store one or more instructions. The one or more instructions, when executed by one or more processors of a first network device, may cause the one or more processors to: receive encryption data identifying a receiving key for decrypting traffic and a transmission key for encrypting traffic; install the receiving key on protocol hardware associated with a data plane of the first network device; receive, from the data plane, a first notification indicating that the receiving key is installed on the protocol hardware; provide, to a second network device, a first key agreement control message identifying the receiving key, wherein the first key agreement control message is provided based on receiving the first notification; receive, from the second network device, a first acknowledgment message indicating that the receiving key is installed on the second network device; install the transmission key on the protocol hardware based on receiving the first acknowledgment message; receive, from the data plane, a second notification indicating that the transmission key is installed on the protocol hardware; provide, to the second network device, a second key agreement control message identifying the transmission key, wherein the second key agreement control message is provided based on receiving the second notification; receive, from the second network device, a second acknowledgment message indicating that the transmission key is installed on the second network device; encrypt traffic with the transmission key based on receiving the first acknowledgment message and to generate encrypted traffic; and provide the encrypted traffic to the second network device to cause the second network device to decrypt the encrypted traffic with the receiving key.

BRIEF DESCRIPTION OF THE DRAWINGS

FIGS. 1A-1J are diagrams of an example implementation described herein.

DETAILED DESCRIPTION

Figure 1A:
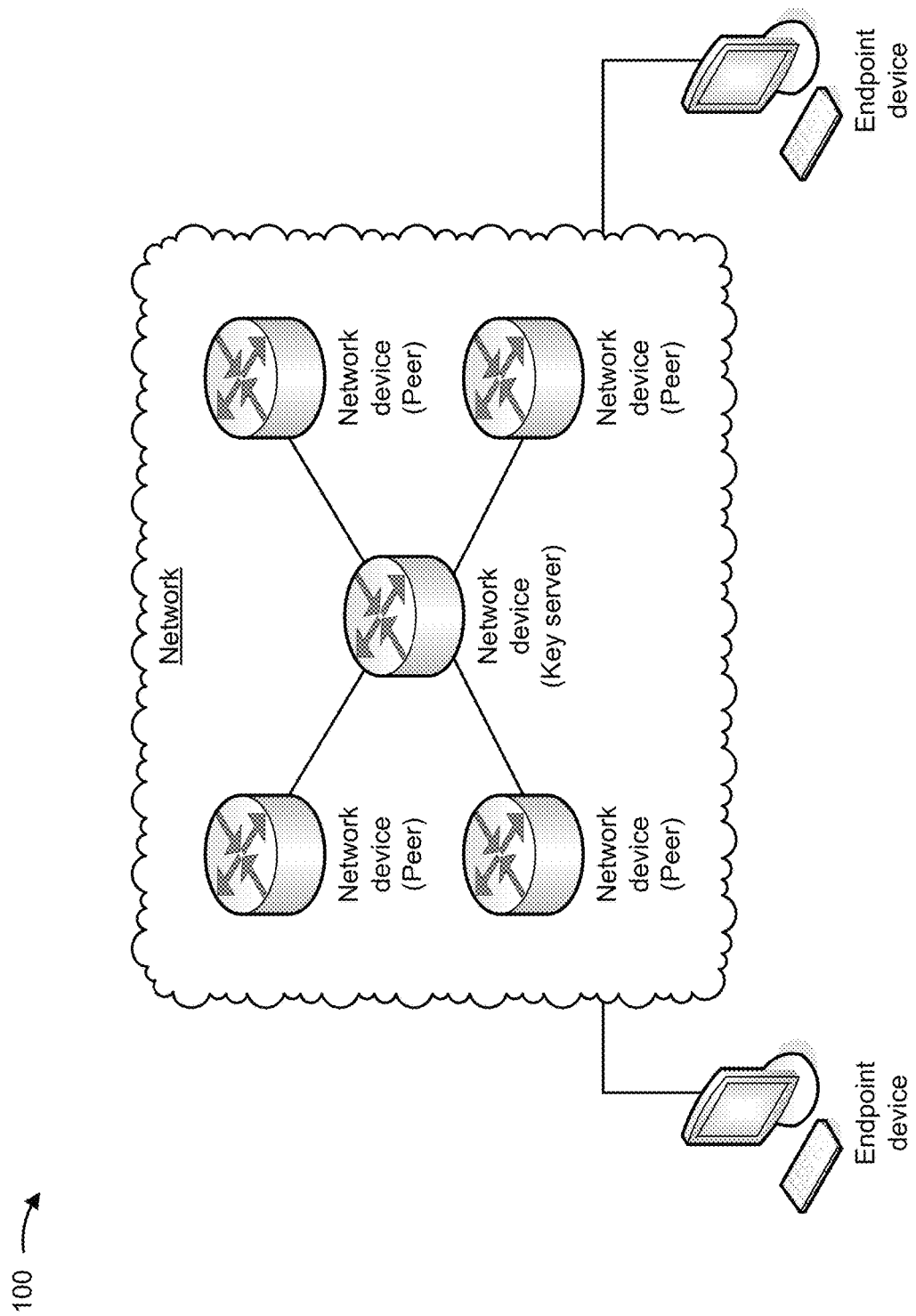

The following detailed description of example implementations refers to the accompanying drawings. The same reference numbers in different drawings may identify the same or similar elements.

Various security protocols, such as media access control security (MACsec) protocol, Internet protocol security (IPsec) protocol, and/or the like, are used for secured communications between network devices. In one example, during use of the MACsec protocol, security keys (e.g., comprising a transmission key, a receiving key, and/or the like) are created and maintained between communicating network devices for encryption and decryption of traffic (e.g., network traffic communicated between the network devices via a MACsec communication link). For example, a transmitting network device may use a transmission key to encrypt and send traffic to a receiving network device that uses a receiving key to decrypt the traffic. The security keys need to be changed from time to time in order to ensure that the MACsec communication link between communicating network devices remains secured. This may be referred to as a key rollover (e.g., when the network devices install and/or use new security keys).

In order to facilitate a key rollover, a key server network device initiates (e.g., using a protocol daemon in a control plane of the key server network device) an install of a new receiving key on the key server network device (e.g., in the data plane of the key server network device) and sends the receiving key to a peer network device, which initiates (e.g., using a protocol daemon in a control plane of the peer network device) an install of the new receiving key on the peer network device (e.g., in the data plane of the peer network device). The peer network device then sends (e.g., using the protocol daemon of the peer network device) a first acknowledgment to the key server network device indicating that the peer network device has initiated installation of the receiving key. The key server network device initiates (e.g., using the protocol daemon of the key server network device), based on receiving the first acknowledgment, an install of a new transmission key on the key server network device (e.g., in the data plane of the key server network device). Accordingly, the key server network device encrypts, after installing the new transmission key on the key server network device, traffic using the new transmission key and sends the traffic to the peer network device to be decrypted using the new receiving key. Moreover, the key server network device sends the transmission key to the peer network device, which initiates (e.g., using the protocol daemon of the peer network device) an install of the new transmission key on the peer network device (e.g., in the data plane of the peer network device). The peer network device then sends (e.g., using the protocol daemon of the peer network device) a second acknowledgment to the key server network device indicating that the peer network device has initiated installation of the new transmission key.

However, the above scheme relies on messages being sent when installation of a new security key has initiated (as opposed to when installation of the new security key is complete). Consequently, a peer network device may not have finished installing a new receiving key when a key server network device starts to transmit traffic to the peer network device that has been encrypted using a new transmission key (and that can be decrypted using only the new receiving key). This may be because the peer network device has encountered processing or scheduling delays associated with other activities involving the data plane of the peer network device, and thus installation of the receiving key has not yet occurred. The peer network device may therefore receive traffic that the peer network device cannot decrypt (e.g., because the peer network device has not finished installing the new receiving key), which results in traffic loss. Furthermore, the key server network device, the peer network device, and/or the like may consume computing resources (e.g., processing resources, memory resources, power resources, and/or the like) to recommunicate the traffic from the key server network device to the peer network device (e.g., after the peer network device has finished installing the receiving key) due to the traffic loss.

Some implementations described herein provide a key server network device and a peer network device that send messages when installation of a new security key is complete. In some implementations, a protocol daemon of a control plane of the key server network device may communicate with a data plane daemon of a data plane of the key server network device to install a receiving key on the data plane of the key server network device. After installation of the receiving key is complete, the data plane daemon may notify the protocol daemon that the receiving key is installed, which allows the protocol daemon to send a first key agreement control message that includes the receiving key to the peer network device. A protocol daemon of a control plane of the peer network device may communicate, based on the first key agreement control message, with a data plane daemon of a data plane of the peer network device to install the receiving key on the data plane of the peer network device. After installation of the receiving key is complete, the data plane daemon may notify the protocol daemon that the receiving key is installed, which allows the protocol daemon to send, to the key server network device, a first acknowledgment message indicating that the receiving key is installed on the peer network device.

In some implementations, the protocol daemon of the key server network device may communicate, based on receiving the first acknowledgment message, with the data plane daemon of the key server network device to install a transmission key on the data plane of the key server network device. After installation of the transmission key is complete, the data plane daemon may notify the protocol daemon that the transmission key is installed. Accordingly, the key server network device may encrypt, using the transmission key and based on receiving the first acknowledgment message, traffic received from an origination endpoint device and may provide the encrypted traffic to the peer network device. The peer network device may decrypt, using the receiving key, the encrypted traffic and may send the traffic to a destination endpoint device.

Additionally, or alternatively, after installation of the transmission key is complete and the protocol daemon has been notified that the transmission key is installed, the protocol daemon may send a second key agreement control message that includes the transmission key to the peer network device. The protocol daemon of the peer network device may communicate, based on the second key agreement control message, with the data plane daemon of the peer network device to install the transmission key on the data plane of the data plane of the peer network device. After installation of the transmission key is complete, the data plane daemon may notify the protocol daemon that the transmission key is installed, which allows the protocol daemon to send, to the key server network device, a second acknowledgment message indicating that the transmission key is installed on the peer network device.

In this way, the key server network device and/or the peer network device may facilitate a hitless security key rollover (e.g., a security key rollover that eliminates traffic loss, which is also referred to as zero packet loss). This may eliminate a need to consume computing resources (e.g., processing resources, memory resources, power resources, and/or the like) to recommunicate traffic from the key server network device to the peer network device. Further, some implementations described herein provide key rollover without resetting peering sessions (e.g., MACsec sessions, IPsec session, and/or the like) associated with the key server network device and/or the peer network device; without interrupting the security protocol associated with the key server network device and/or the peer network device (e.g., the MACsec protocol, the IPsec protocol, and/or the like); and/or the like. Moreover, some implementations described herein increase an overall predictability and/or stability of the key server network device and/or the peer network device, which may improve a performance of the key server network device and/or the peer network device.

FIGS. 1A-1J are diagrams of one or more examples 100 associated with facilitating hitless security key rollover. As shown in FIGS. 1A-1J, example(s) 100 includes a plurality of endpoint devices and a plurality of network devices. As shown in FIG. 1A, the plurality of network devices may be included in a network and may include a key server network device and one or more peer network devices. The plurality of endpoint devices may communicate with each other via the network that includes the plurality of network devices.

As shown in FIGS. 1B-1I, each network device may be associated with a control plane (also referred to as a protocol layer) and a data plane. The control plane of the network device may include a protocol daemon (e.g., a process or a program) that operates in the background of the control plane of the network device to control installation of one or more security keys on the network device and/or to communicate with other network devices to exchange the one or more security keys. The data plane of the network device may include a data plane daemon and protocol hardware (e.g., hardware to receive traffic, forward traffic, encrypt traffic, decrypt traffic, and/or the like). The data plane daemon (e.g., a process or a program) may operate in the background of the data plane of the network device to obtain the one or more security keys from the protocol daemon of the control plane and to install the one or more security keys on the protocol hardware (e.g., to allow the network device to encrypt and/or decrypt traffic based on the one or more security keys). The network device, the protocol daemon, the data plane daemon, the protocol hardware, and/or the like may be associated with a security protocol, such as a media access control security (MACsec) protocol, an Internet protocol security (IPsec) protocol, and/or the like.

Figure 1B:
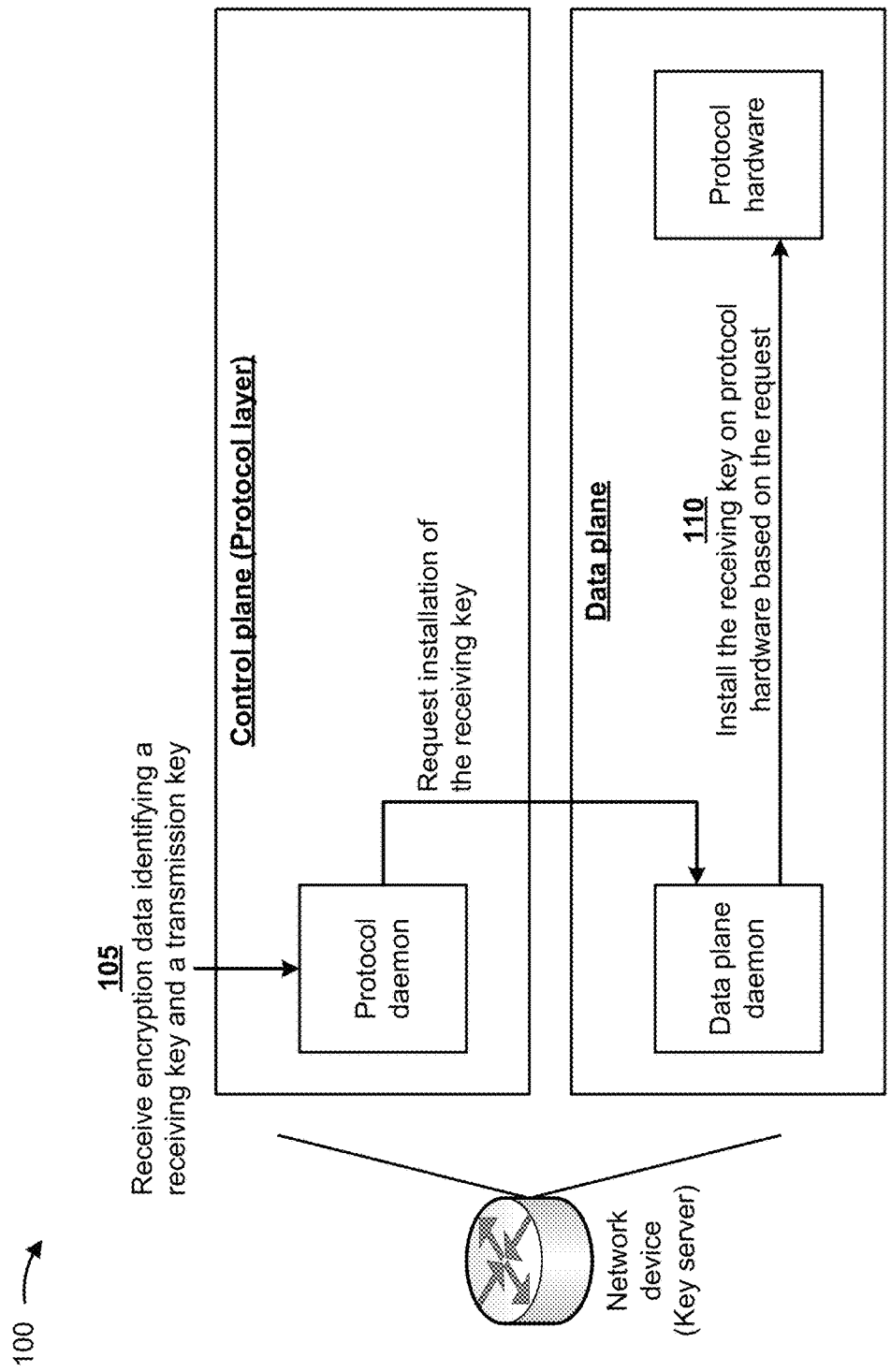

As shown in FIG. 1B and by reference number 105, a protocol daemon of the key server network device may receive encryption data (e.g., from an endpoint device of the plurality of endpoint devices, another network device of the plurality of network devices, and/or the like). The encryption data may identify one or more security keys (e.g., one or more MACsec keys, one or more IPsec keys, and/or the like). In some implementations, the encryption data may identify a receiving key for decrypting traffic and/or a transmission key for encrypting traffic.

In some implementations, the protocol daemon may receive the encryption data at a certain time that is a particular amount of time after receiving former encryption data (e.g., that includes one or more former security keys, such as a former receiving key, a former transmission key, and/or the like). For example, the protocol daemon of the key server may receive the encryption data 10 seconds, 30 seconds, 1 minute, 10 minutes, and/or the like, after receiving the former encryption data. Additionally, or alternatively, the protocol daemon may receive the encryption data after a particular quantity of packets is processed using the one or more former security keys (e.g., after the particular quantity of packets is encrypted and/or decrypted using the one or more former security keys). For example, the protocol daemon may receive the encryption data after 1,000 packets, 10,000 packets, 25,000 packets, and/or the like are processed using the one or more former security keys.

In some implementations, the protocol daemon may communicate with the data plane daemon of the key server network device to cause the receiving key to be installed on the data plane of the key server network device. For example, the protocol daemon may send, to the data plane daemon, a request for installation of the receiving key. As shown by reference number 110, the data plane daemon may install (or cause to be installed) the receiving key on the protocol hardware of the key server network device (e.g., based on the request from the protocol daemon). For example, the data plane daemon may program the receiving key into the protocol hardware.

Figure 1C:
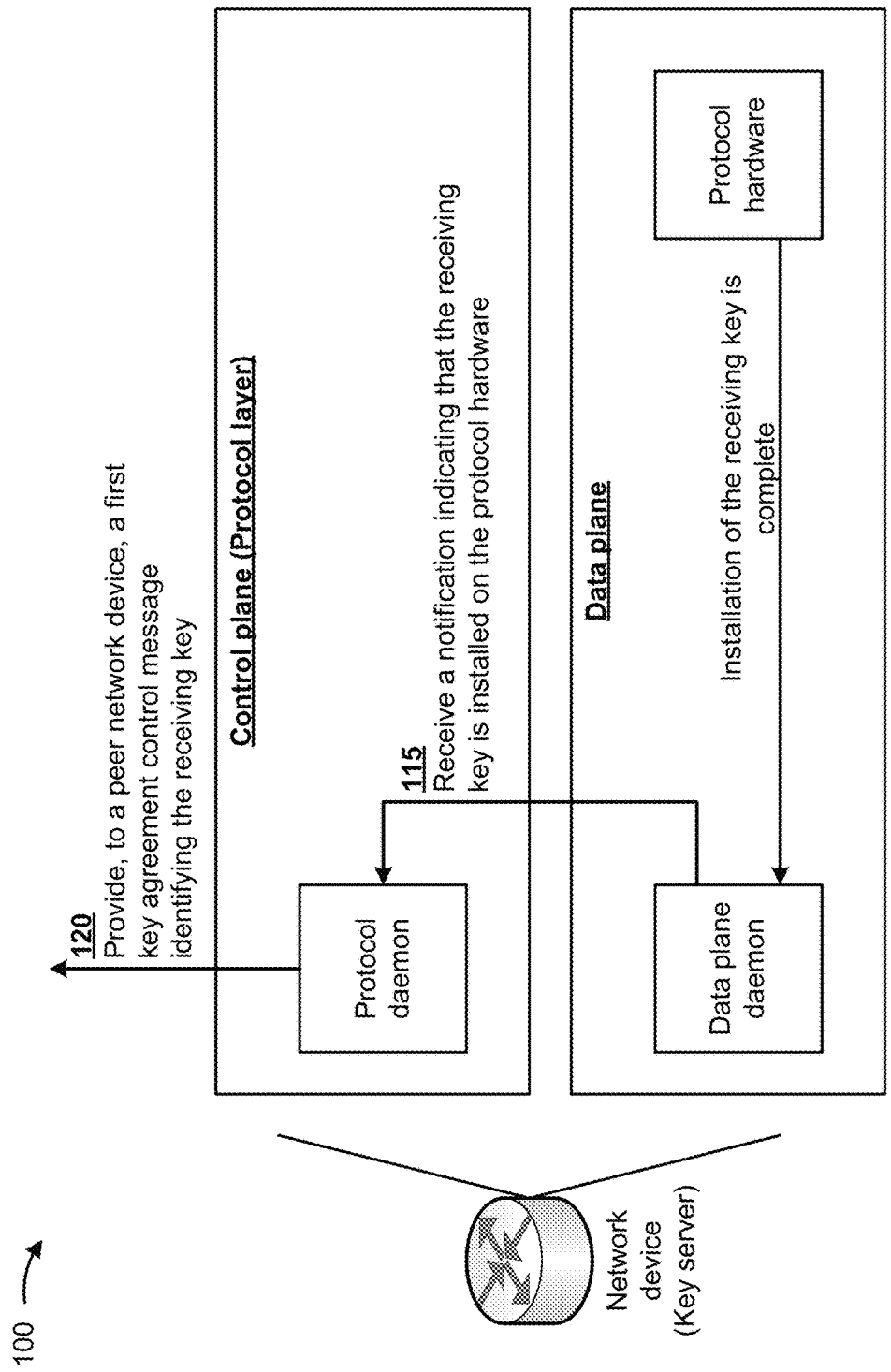

As shown in FIG. 1C, the data plane daemon may determine that installation of the receiving key on the protocol hardware is complete. For example, the protocol hardware may send, upon completion of the installation of the receiving key on the protocol hardware and to the data plane daemon, a message indicating that installation of the receiving key on the protocol hardware is complete.

As shown by reference number 115, the data plane daemon may send, to the protocol daemon, a notification indicating that the receiving key is installed on the protocol hardware (e.g., based on determining that installation of the receiving key on the protocol hardware is complete). As shown by reference number 120, the protocol daemon may provide (e.g., send, transmit, forward, and/or the like), to a peer network device, a first key agreement control message (e.g., based on receiving the notification indicating that the receiving key is installed on the protocol hardware). The first key agreement control message may identify the receiving key (e.g., to allow the receiving key to be installed on the peer network device).

Figure 1D:
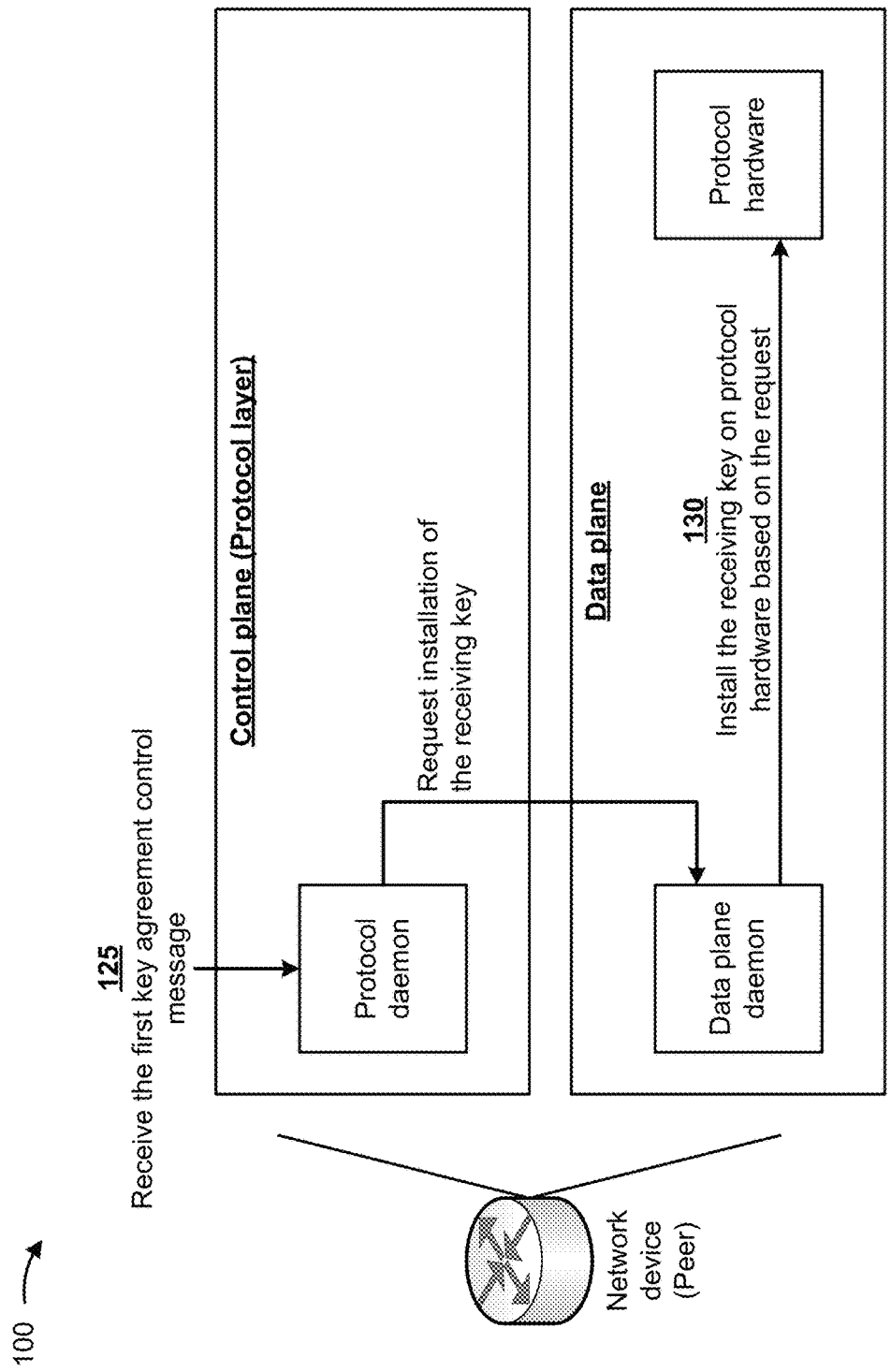

As shown in FIG. 1D and by reference number 125, the protocol daemon of the peer network device may receive the first key agreement control message (e.g., that the protocol daemon of the key server network device sent to the peer network device). In some implementations, the protocol daemon may communicate with the data plane daemon of the peer network device to cause the receiving key to be installed on the data plane of the peer network device. For example, the protocol daemon may send, to the data plane daemon, a request for installation of the receiving key.

As shown by reference number 130, the data plane daemon may install (or cause to be installed) the receiving key on the protocol hardware of the peer network device (e.g., based on the request from the protocol daemon). For example, the data plane daemon may program the receiving key into the protocol hardware.

Figure 1E:
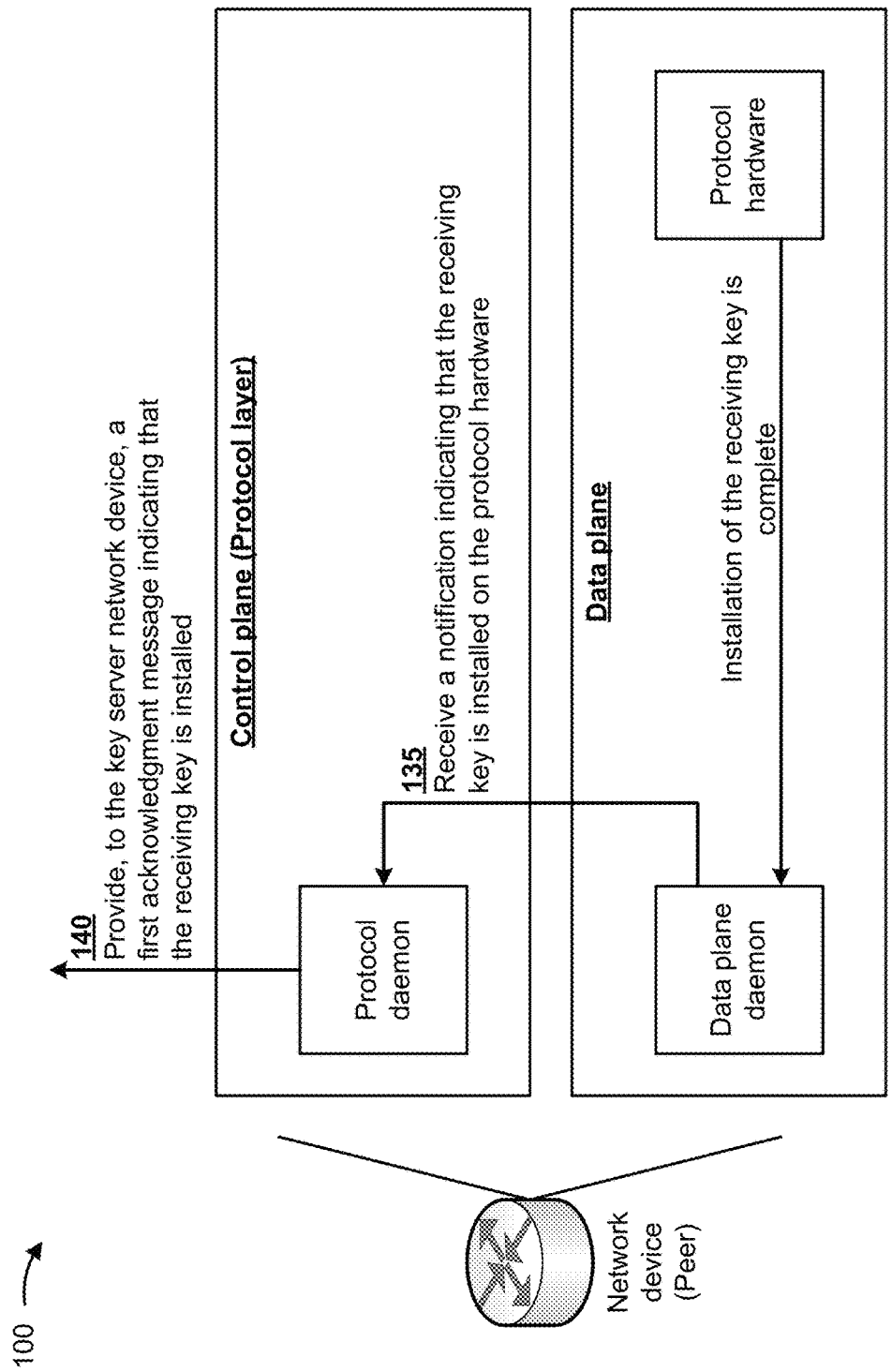

As shown in FIG. 1E, the data plane daemon may determine that installation of the receiving key on the protocol hardware is complete. For example, the protocol hardware may send, upon completion of the installation of the receiving key on the protocol hardware and to the data plane daemon, a message indicating that installation of the receiving key on the protocol hardware is complete.

As shown by reference number 135, the data plane daemon may send, to the protocol daemon, a notification indicating that the receiving key is installed on the protocol hardware (e.g., based on determining that installation of the receiving key on the protocol hardware is complete). As shown by reference number 140, the protocol daemon may provide (e.g., send, transmit, forward, and/or the like), to the key server network device, a first acknowledgment message (e.g., based on receiving the notification indicating that the receiving key is installed on the protocol hardware). The first acknowledgment message may indicate that the receiving key is installed on the peer network device.

As shown in FIG. 1F and by reference number 145, the protocol daemon of the key server network device may receive the first acknowledgment message (e.g., that the protocol daemon of the peer network device sent to the key server network device). In some implementations, the protocol daemon may communicate with the data plane daemon of the key server network device to cause the transmission key (e.g., that is identified in the encryption data that was received by the protocol daemon, as described herein in relation to FIG. 1B and reference number 105) to be installed on the data plane of the key server network device (e.g., based on the first acknowledgment message). For example, the protocol daemon may send, to the data plane daemon, a request for installation of the transmission key.

As shown by reference number 150, the data plane daemon may install (or cause to be installed) the transmission key on the protocol hardware of the key server network device (e.g., based on the request from the protocol daemon). For example, the data plane daemon may program the transmission key into the protocol hardware.

Figure 1G:
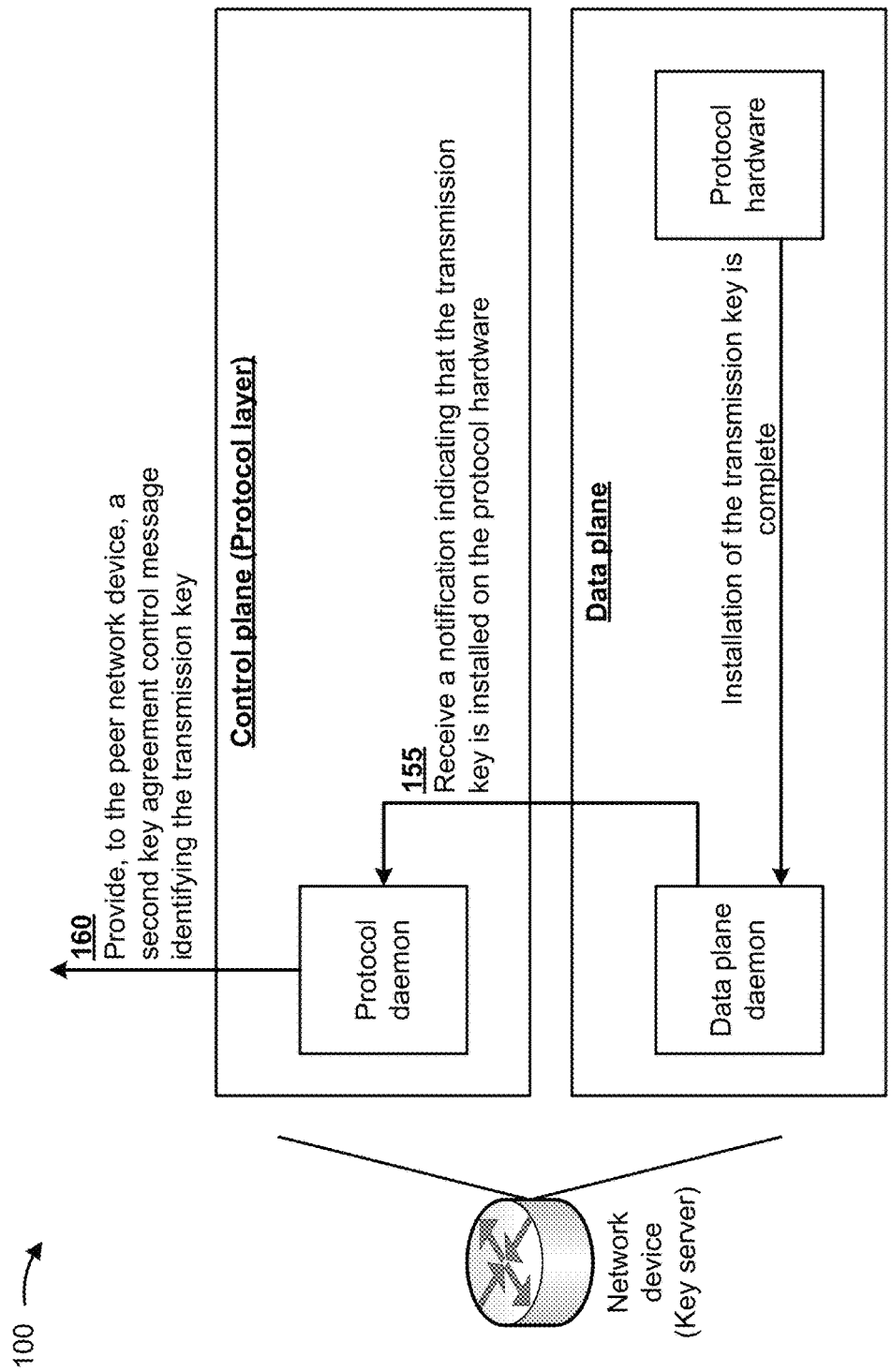

As shown in FIG. 1G, the data plane daemon may determine that installation of the transmission key on the protocol hardware is complete. For example, the protocol hardware may send, upon completion of the installation of the transmission key on the protocol hardware and to the data plane daemon, a message indicating that installation of the transmission key on the protocol hardware is complete.

As shown by reference number 155, the data plane daemon may send, to the protocol daemon, a notification indicating that the transmission key is installed on the protocol hardware (e.g., based on determining that installation of the transmission key on the protocol hardware is complete). As shown by reference number 160, the protocol daemon may provide (e.g., send, transmit, forward, and/or the like), to the peer network device, a second key agreement control message (e.g., based on receiving the notification indicating that the transmission key is installed on the protocol hardware). The second key agreement control message may identify the transmission key (e.g., to allow the transmission key to be installed on the peer network device).

As shown in FIG. 1H and by reference number 165, the protocol daemon of the peer network device may receive the second key agreement control message (e.g., that the protocol daemon of the key server network device sent to the peer network device). In some implementations, the protocol daemon may communicate with the data plane daemon of the peer network device to cause the transmission key to be installed on the data plane of the peer network device. For example, the protocol daemon may send, to the data plane daemon, a request for installation of the transmission key.

As shown by reference number 170, the data plane daemon may install (or cause to be installed) the transmission key on the protocol hardware of the peer network device (e.g., based on the request from the protocol daemon). For example, the data plane daemon may program the transmission key into the protocol hardware.

Figure 1I:
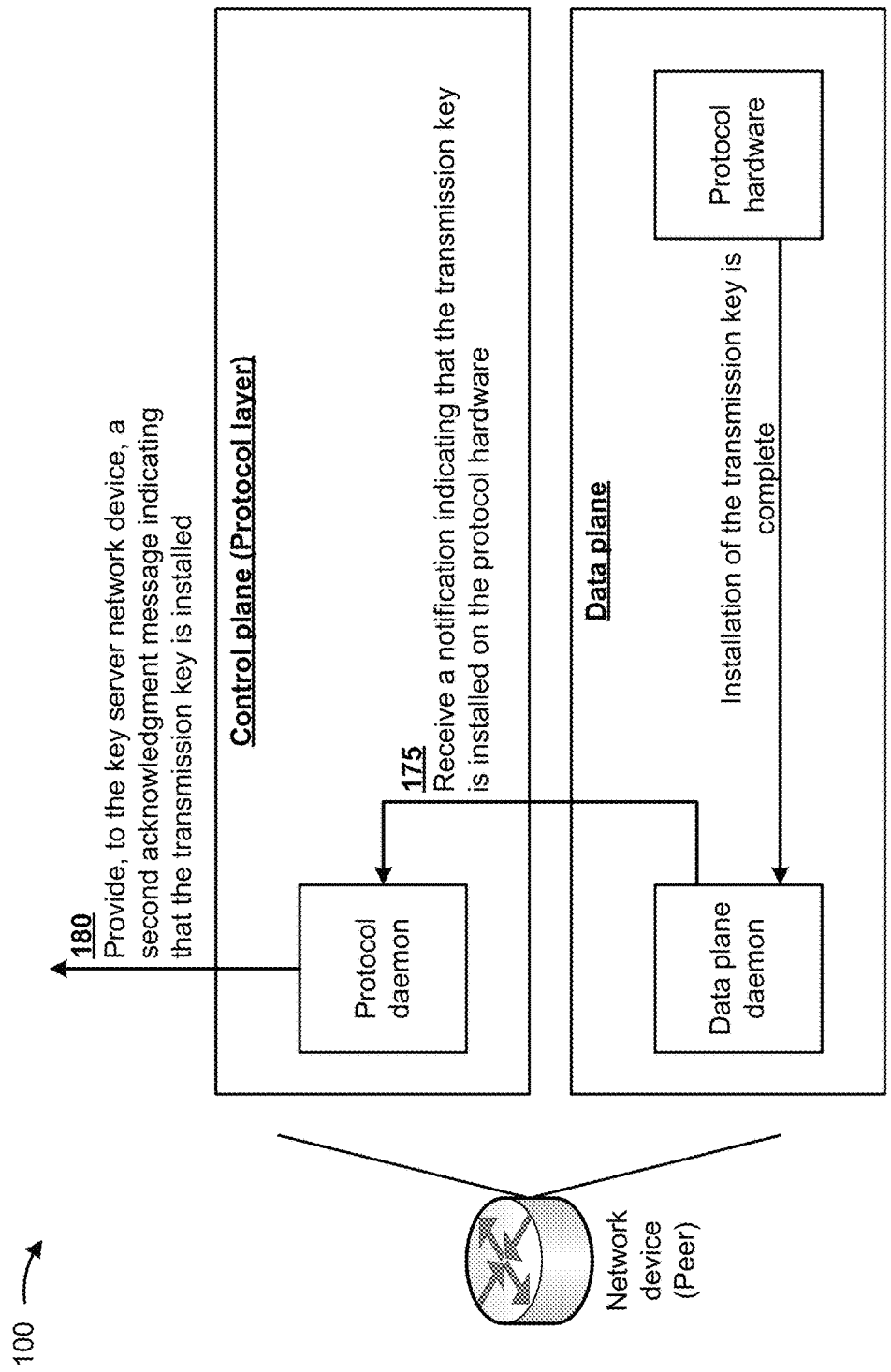

As shown in FIG. 1I, the data plane daemon may determine that installation of the transmission key on the protocol hardware is complete. For example, the protocol hardware may send, upon completion of the installation of the transmission key on the protocol hardware and to the data plane daemon, a message indicating that installation of the transmission key on the protocol hardware is complete.

As shown by reference number 175, the data plane daemon may send, to the protocol daemon, a notification indicating that the transmission key is installed on the protocol hardware (e.g., based on determining that installation of the transmission key on the protocol hardware is complete). As shown by reference number 180, the protocol daemon may provide (e.g., send, transmit, forward, and/or the like), to the key server network device, a second acknowledgment message (e.g., based on receiving the notification indicating that the transmission key is installed on the protocol hardware). The second acknowledgment message may indicate that the transmission key is installed on the peer network device.

Figure 1J:
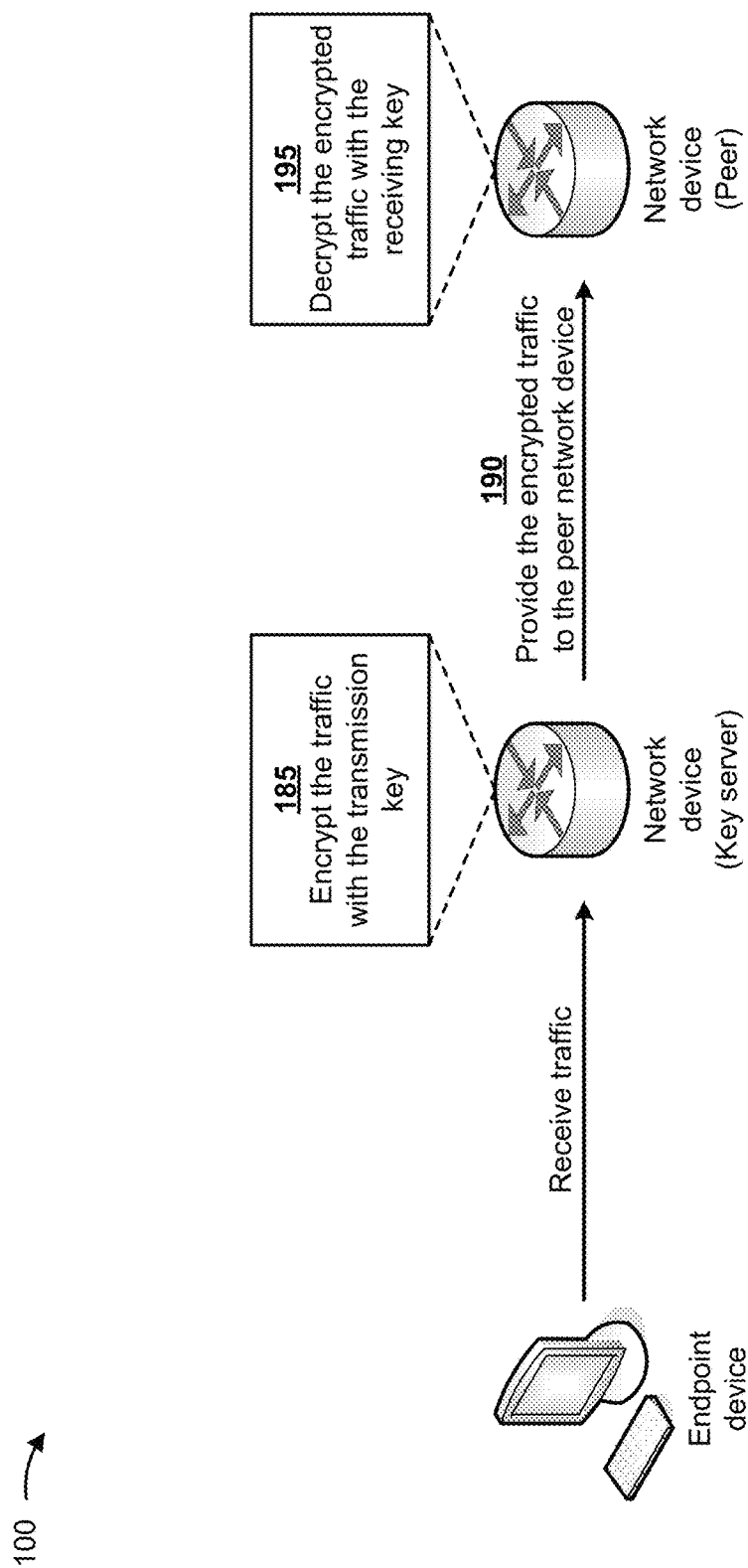

As shown in FIG. 1J, a first endpoint device of the plurality of endpoint devices (e.g., an origination endpoint device) may send, to the key server network device, traffic that is destined for a second endpoint device (e.g., a destination endpoint device). As shown by reference number 185, the key server network device may, based on receiving the first acknowledgment message (e.g., indicating that the receiving key is installed on the peer network device) and using the transmission key, encrypt the traffic to generate encrypted traffic. As shown by reference number 190, the key server network device may provide (e.g., send, route, forward, and/or the like) the encrypted traffic to the peer network device. As shown by reference number 195, the peer network device may decrypt, using the receiving key, the encrypted traffic. In some implementations, the peer network device may send the traffic (e.g., after decrypting the traffic) to the second endpoint device.

As indicated above, FIGS. 1A-1J are provided as an example. Other examples may differ from what is described with regard to FIGS. 1A-1J. The number and arrangement of devices shown in FIGS. 1A-1J are provided as an example. In practice, there may be additional devices, fewer devices, different devices, or differently arranged than those shown in FIGS. 1A-1J. Furthermore, two or more devices shown in FIGS. 1A-1J may be implemented within a single device, or a single device shown in FIGS. 1A-1J may be implemented as multiple, distributed devices. Additionally, or alternatively, a set of devices (e.g., one or more devices) shown in FIGS. 1A-1J may perform one or more functions described as being performed by another set of devices shown in FIGS. 1A-1J.

Figure 2:
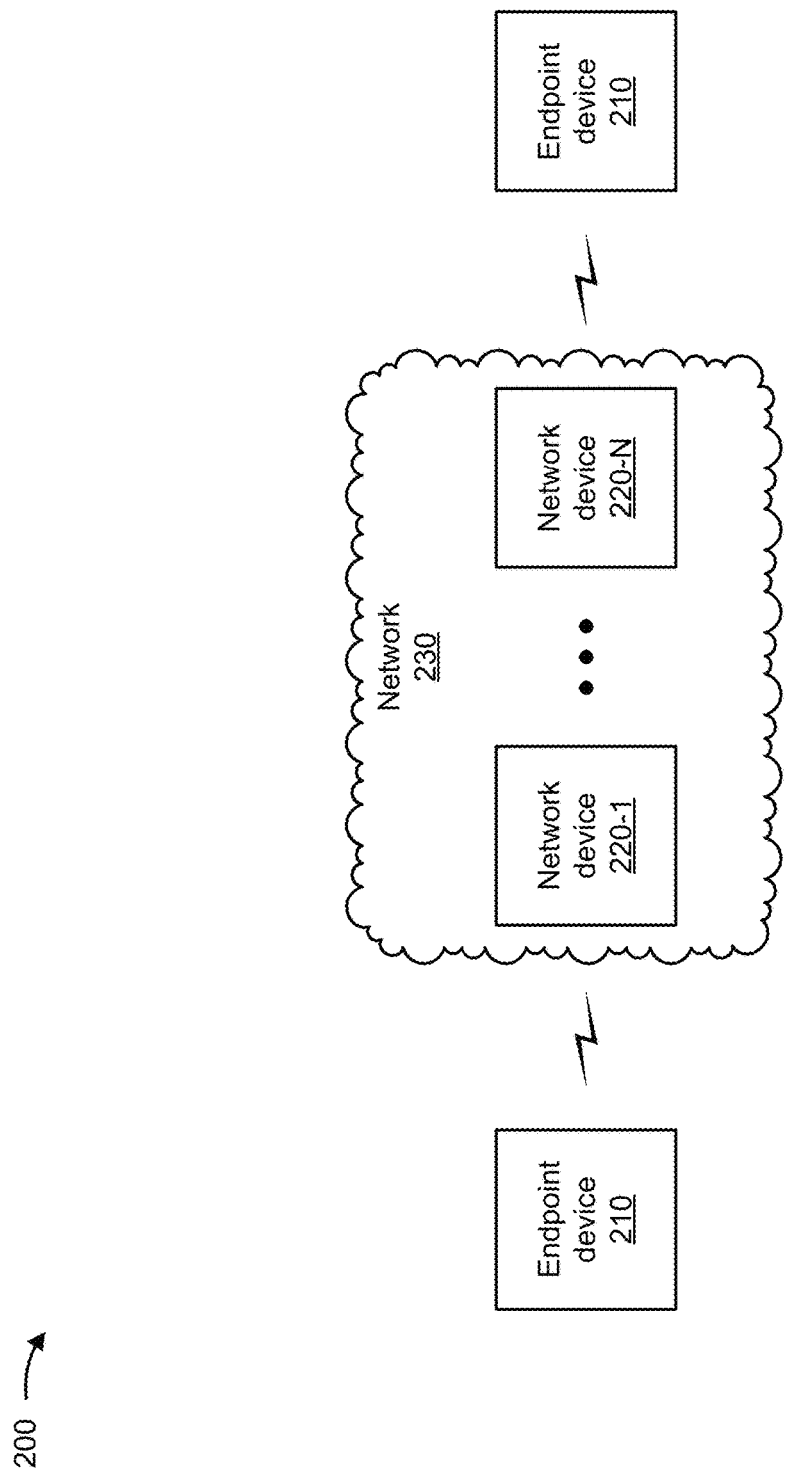
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include one or more endpoint devices 210, one or more network devices 220 (shown as network device 220-1 through network device 220-N, where N≥1), and a network 230. Devices of environment 200 may interconnect via wired connections, wireless connections, or a combination of wired and wireless connections.

Endpoint device 210 includes one or more devices capable of receiving, generating, storing, processing, and/or providing information, such as information described herein. For example, endpoint device 210 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), a network device, or a similar type of device. In some implementations, endpoint device 210 may receive network traffic from and/or may provide network traffic to other endpoint devices 210 via network 230 (e.g., by routing packets using network devices 220 as intermediaries).

Network device 220 includes one or more devices capable of receiving, processing, storing, routing, and/or providing traffic (e.g., a packet, other information or metadata, and/or the like) in a manner described herein. For example, network device 220 may include a router, such as a label switching router (LSR), a label edge router (LER), an ingress router, an egress router, a provider router (e.g., a provider edge router, a provider core router, and/or the like), a virtual router, and/or the like. Additionally, or alternatively, network device 220 may include a gateway, a switch, a firewall, a hub, a bridge, a reverse proxy, a server (e.g., a proxy server, a cloud server, a data center server, and/or the like), a load balancer, and/or a similar device. In some implementations, network device 220 may be a key server network device, a peer network device, and/or the like.

In some implementations, network device 220 may be a physical device implemented within a housing, such as a chassis. In some implementations, network device 220 may be a virtual device implemented by one or more computer devices of a cloud computing environment or a data center. In some implementations, a group of network devices 220 may be a group of data center nodes that are used to route traffic flow through network 230.

Network 230 includes one or more wired and/or wireless networks. For example, network 230 may include a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
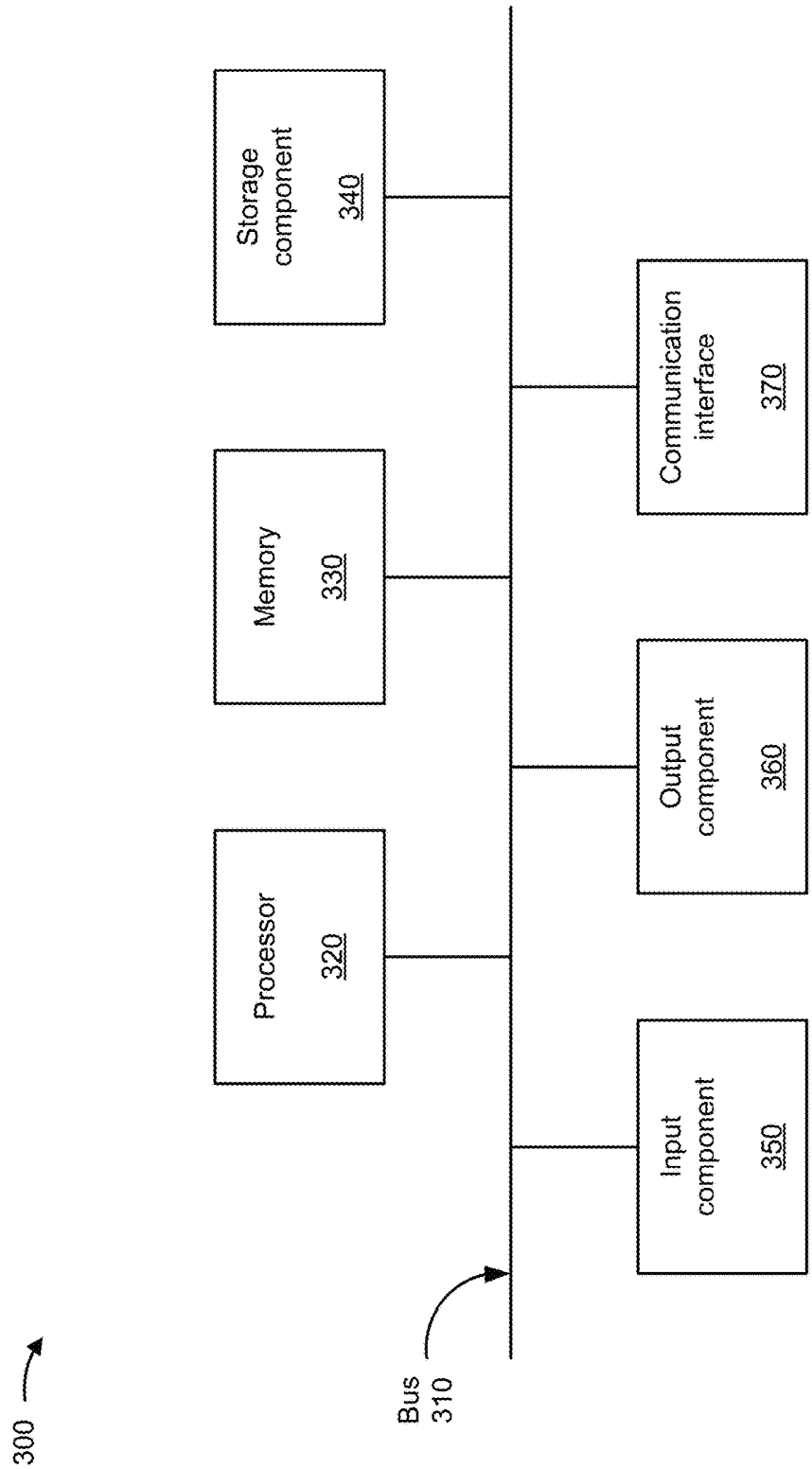
FIGS. 3-4 are diagrams of example components of one or more devices of FIG. 2.

FIG. 3 is a diagram of example components of a device 300. Device 300 may correspond to endpoint device 210 and/or network device 220. In some implementations, endpoint device 210 and/or network device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more LEDs).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, an RF interface, a universal serial bus (USB) interface, a wireless local area interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
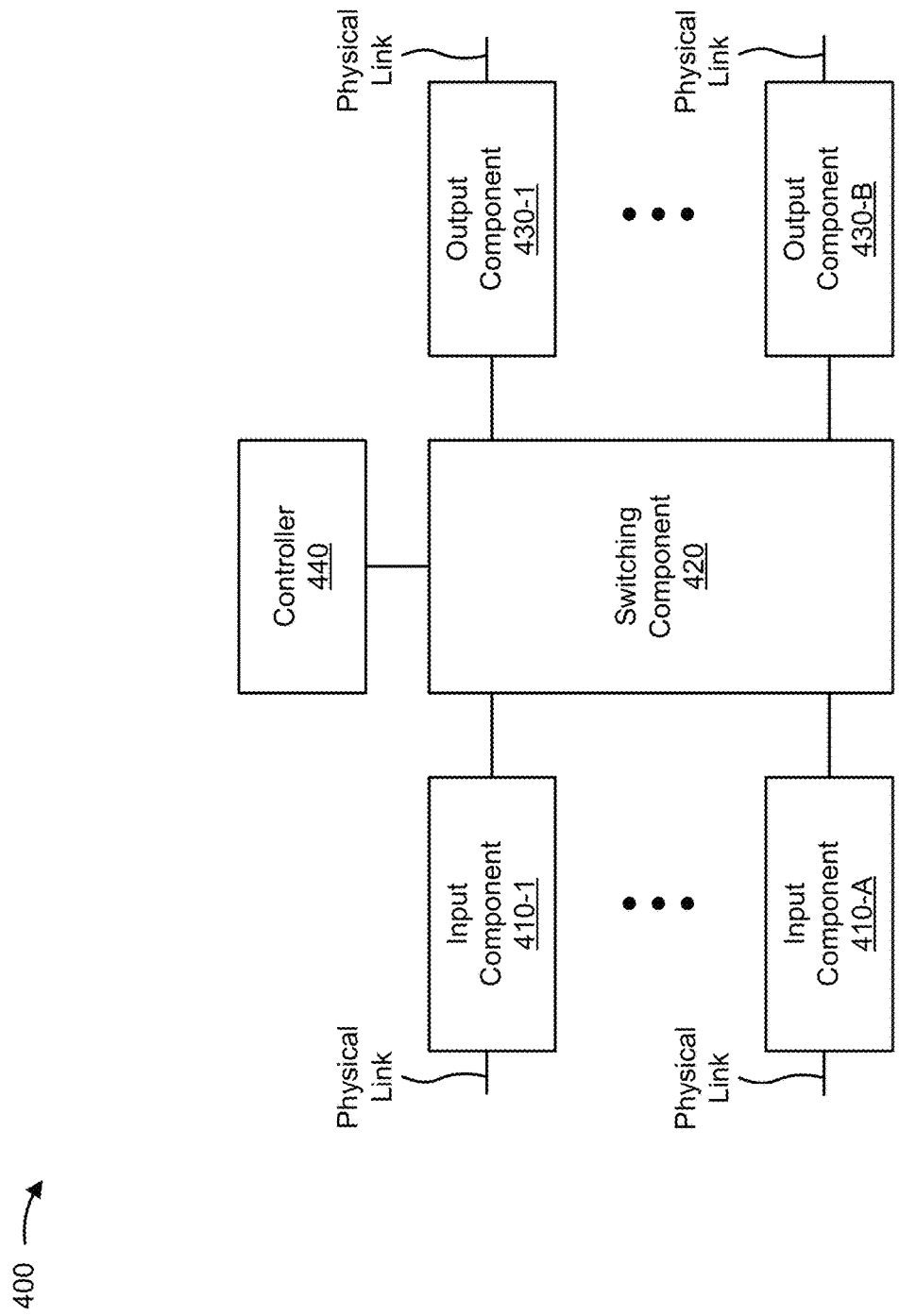

FIG. 4 is a diagram of example components of a device 400. Device 400 may correspond to endpoint device 210 and/or network device 220. In some implementations, endpoint device 210 and/or network device 220 may include one or more devices 400 and/or one or more components of device 400. As shown in FIG. 4, device 400 may include one or more input components 410-1 through 410-A (A≥1) (hereinafter referred to collectively as input components 410, and individually as input component 410), a switching component 420, one or more output components 430-1 through 430-B (B≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
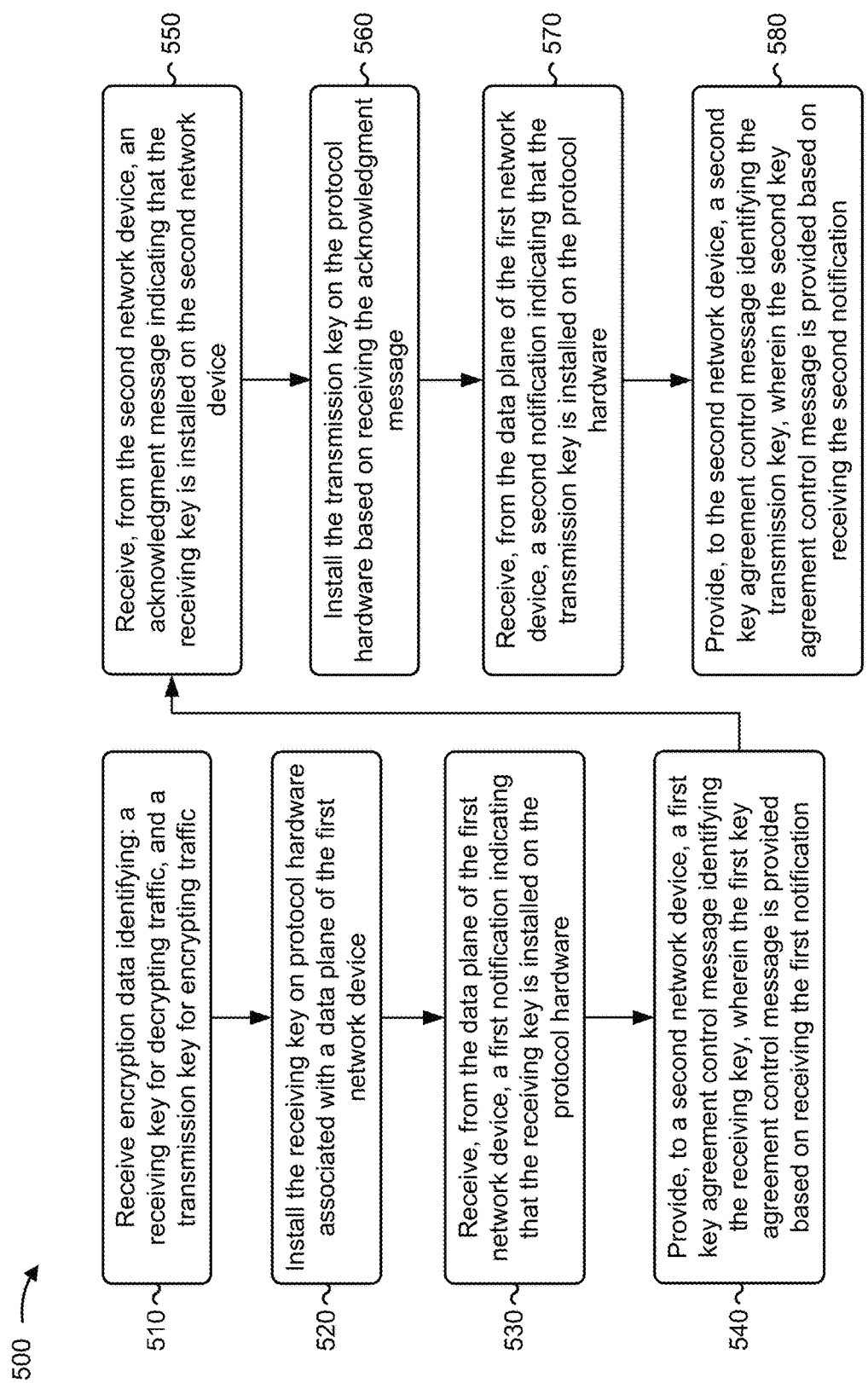
FIGS. 5-7 are flowcharts of example processes relating to facilitating hitless security key rollover.

FIG. 5 is a flowchart of an example process 500 associated with facilitating hitless security key rollover. In some implementations, one or more process blocks of FIG. 5 may be performed by a first network device (e.g., network device 220). In some implementations, one or more process blocks of FIG. 5 may be performed by another device or a group of devices separate from or including the first network device, such as an endpoint device (e.g., endpoint device 210), and/or the like. Additionally, or alternatively, one or more process blocks of FIG. 5 may be performed by one or more components of a device 300, such as processor 320, memory 330, storage component 340, input component 350, output component 360, communication interface 370, and/or the like; and/or the like; one or more components of a device 400, such as input component 410, switching component 420, output component 430, controller 440, and/or the like; and/or the like.

As shown in FIG. 5, process 500 may include receiving encryption data identifying a receiving key for decrypting traffic, and a transmission key for encrypting traffic (block 510). For example, the first network device may receive encryption data identifying a receiving key for decrypting traffic, and a transmission key for encrypting traffic, as described above.

As further shown in FIG. 5, process 500 may include installing the receiving key on protocol hardware associated with a data plane of the first network device (block 520). For example, the first network device may install the receiving key on protocol hardware associated with a data plane of the first network device, as described above.

As further shown in FIG. 5, process 500 may include receiving, from the data plane of the first network device, a first notification indicating that the receiving key is installed on the protocol hardware (block 530). For example, the first network device may receive, from the data plane of the first network device, a first notification indicating that the receiving key is installed on the protocol hardware, as described above.

As further shown in FIG. 5, process 500 may include providing, to a second network device, a first key agreement control message identifying the receiving key, wherein the first key agreement control message is provided based on receiving the first notification (block 540). For example, the first network device may provide, to a second network device, a first key agreement control message identifying the receiving key, as described above. In some implementations, the first key agreement control message is provided based on receiving the first notification.

As further shown in FIG. 5, process 500 may include receiving, from the second network device, an acknowledgment message indicating that the receiving key is installed on the second network device (block 550). For example, the first network device may receive, from the second network device, an acknowledgment message indicating that the receiving key is installed on the second network device, as described above.

As further shown in FIG. 5, process 500 may include installing the transmission key on the protocol hardware based on receiving the acknowledgment message (block 560). For example, the first network device may install the transmission key on the protocol hardware based on receiving the acknowledgment message, as described above.

As further shown in FIG. 5, process 500 may include receiving, from the data plane of the first network device, a second notification indicating that the transmission key is installed on the protocol hardware (block 570). For example, the first network device may receive, from the data plane of the first network device, a second notification indicating that the transmission key is installed on the protocol hardware, as described above.

As further shown in FIG. 5, process 500 may include providing, to the second network device, a second key agreement control message identifying the transmission key, wherein the second key agreement control message is provided based on receiving the second notification (block 580). For example, the first network device may provide, to the second network device, a second key agreement control message identifying the transmission key, as described above. In some implementations, the second key agreement control message is provided based on receiving the second notification.

Process 500 may include additional implementations, such as any single implementation or any combination of implementations described below and/or in connection with one or more other processes described elsewhere herein.

In a first implementation, the acknowledgment message is based on an additional notification, received by the second network device and from a data plane of the second network device, indicating that the receiving key is installed on protocol hardware associated with the data plane of the second network device.

In a second implementation, alone or in combination with the first implementation, process 500 includes encrypting traffic with the transmission key based on receiving the acknowledgment message and to generate encrypted traffic, and providing the encrypted traffic to the second network device to cause the second network device to decrypt the encrypted traffic with the receiving key.

In a third implementation, alone or in combination with one or more of the first and second implementations, process 500 includes encrypting traffic with the transmission key based on receiving the other acknowledgment message and to generate encrypted traffic, and providing the encrypted traffic to the second network device to cause the second network device to decrypt the encrypted traffic with the receiving key.

In a fourth implementation, alone or in combination with one or more of the first through third implementations, the protocol hardware is associated with one of a media access control security protocol, or an Internet protocol security protocol.

In a fifth implementation, alone or in combination with one or more of the first through fourth implementations, the first network device includes a key server network device and the second network device includes a peer network device.

In a sixth implementation, alone or in combination with one or more of the first through fifth implementations, the first notification and the second notification enable the first network device to provide security key rollover without resulting in traffic loss.

In a seventh implementation, alone or in combination with one or more of the first through sixth implementations, receiving the encryption data comprises receiving the encryption data identifying the receiving key and the transmission key a particular time period after receiving former security keys.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
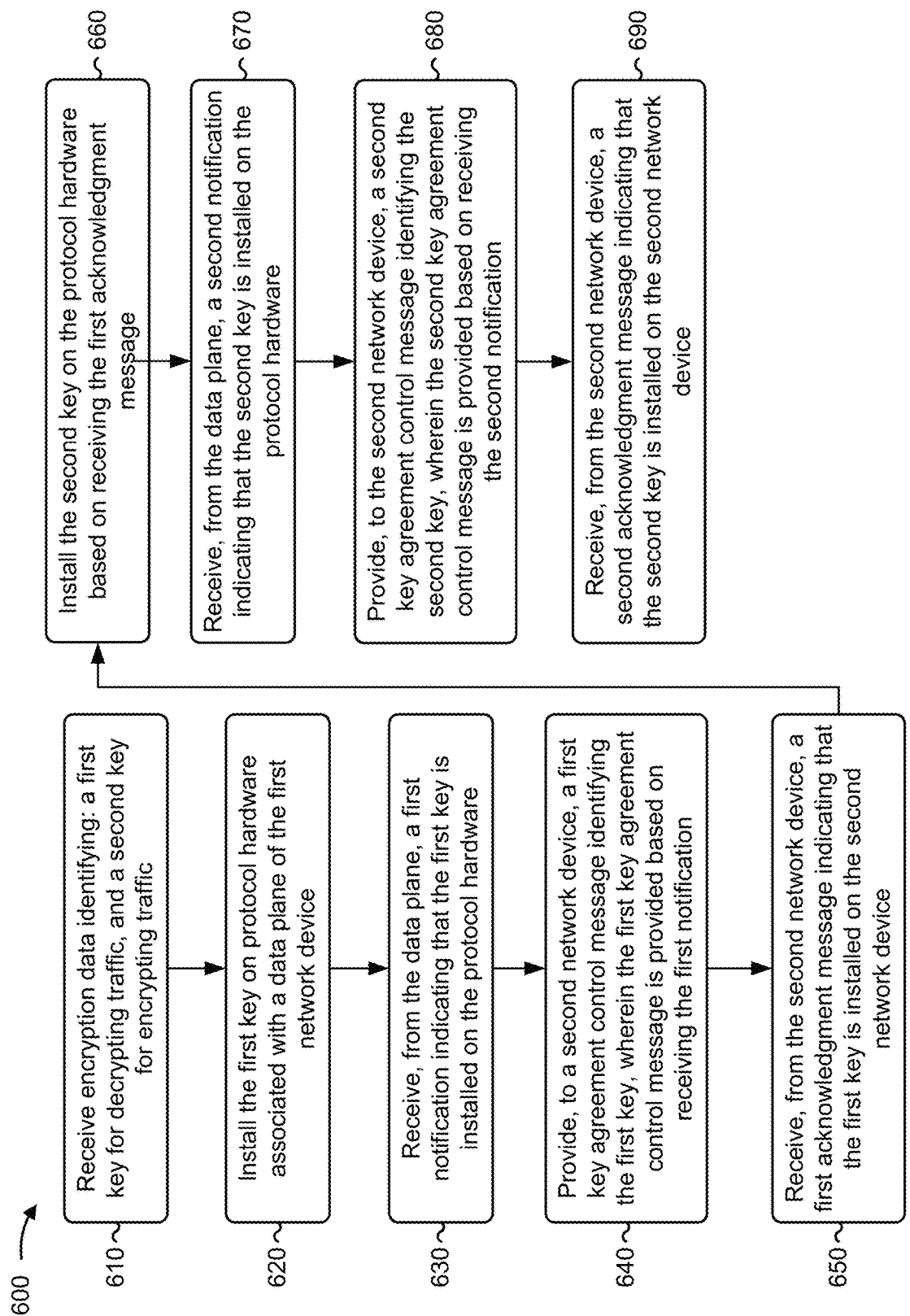

FIG. 6 is a flowchart of an example process 600 associated with facilitating hitless security key rollover. In some implementations, one or more process blocks of FIG. 6 may be performed by a first network device (e.g., network device 220). In some implementations, one or more process blocks of FIG. 6 may be performed by another device or a group of devices separate from or including the first network device, such as an endpoint device (e.g., endpoint device 210), and/or the like. Additionally, or alternatively, one or more process blocks of FIG. 6 may be performed by one or more components of a device 300, such as processor 320, memory 330, storage component 340, input component 350, output component 360, communication interface 370, and/or the like; and/or the like; one or more components of a device 400, such as input component 410, switching component 420, output component 430, controller 440, and/or the like; and/or the like.

As shown in FIG. 6, process 600 may include receiving encryption data identifying a first key for decrypting traffic, and a second key for encrypting traffic (block 610). For example, the first network device may receive encryption data identifying a first key for decrypting traffic, and a second key for encrypting traffic, as described above.

As further shown in FIG. 6, process 600 may include installing the first key on protocol hardware associated with a data plane of the first network device (block 620). For example, the first network device may install the first key on protocol hardware associated with a data plane of the first network device, as described above.

As further shown in FIG. 6, process 600 may include receiving, from the data plane, a first notification indicating that the first key is installed on the protocol hardware (block 630). For example, the first network device may receive, from the data plane, a first notification indicating that the first key is installed on the protocol hardware, as described above.

As further shown in FIG. 6, process 600 may include providing, to a second network device, a first key agreement control message identifying the first key, wherein the first key agreement control message is provided based on receiving the first notification (block 640). For example, the first network device may provide, to a second network device, a first key agreement control message identifying the first key, as described above. In some implementations, the first key agreement control message is provided based on receiving the first notification.

As further shown in FIG. 6, process 600 may include receiving, from the second network device, a first acknowledgment message indicating that the first key is installed on the second network device (block 650). For example, the first network device may receive, from the second network device, a first acknowledgment message indicating that the first key is installed on the second network device, as described above.

As further shown in FIG. 6, process 600 may include installing the second key on the protocol hardware based on receiving the first acknowledgment message (block 660). For example, the first network device may install the second key on the protocol hardware based on receiving the first acknowledgment message, as described above.

As further shown in FIG. 6, process 600 may include receiving, from the data plane, a second notification indicating that the second key is installed on the protocol hardware (block 670). For example, the first network device may receive, from the data plane, a second notification indicating that the second key is installed on the protocol hardware, as described above.

As further shown in FIG. 6, process 600 may include providing, to the second network device, a second key agreement control message identifying the second key, wherein the second key agreement control message is provided based on receiving the second notification (block 680). For example, the first network device may provide, to the second network device, a second key agreement control message identifying the second key, as described above. In some implementations, the second key agreement control message is provided based on receiving the second notification.

As further shown in FIG. 6, process 600 may include receiving, from the second network device, a second acknowledgment message indicating that the second key is installed on the second network device (block 690). For example, the first network device may receive, from the second network device, a second acknowledgment message indicating that the second key is installed on the second network device, as described above.

Process 600 may include additional implementations, such as any single implementation or any combination of implementations described below and/or in connection with one or more other processes described elsewhere herein.

In a first implementation, receiving the encryption data includes receiving the encryption data identifying the first key and the second key after a quantity of packets is processed with former security keys.

In a second implementation, alone or in combination with the first implementation, the second network device is included in a plurality of peer network devices associated with the first network device, and process 600 includes receiving, from the plurality of peer network devices, a plurality of acknowledgment messages indicating that the first key is installed on each of the plurality of peer network devices, and encrypting traffic with the second key based on receiving the plurality of acknowledgment messages and to generate encrypted traffic.

In a third implementation, alone or in combination with one or more of the first and second implementations, process 600 includes providing the encrypted traffic to one or more of the plurality of peer network devices, to cause the one or more of the plurality of peer network devices to decrypt the encrypted traffic with the first key.

In a fourth implementation, alone or in combination with one or more of the first through third implementations, the first notification and the second notification enable the first network device to provide security key rollover with zero packet loss.

In a fifth implementation, alone or in combination with one or more of the first through fourth implementations, installing the first key on the protocol hardware comprises programming the first key into the protocol hardware.

In a sixth implementation, alone or in combination with one or more of the first through fifth implementations, installing the second key on the protocol hardware based on receiving the first acknowledgment message comprises programming the second key into the protocol hardware after receiving the first acknowledgment message.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
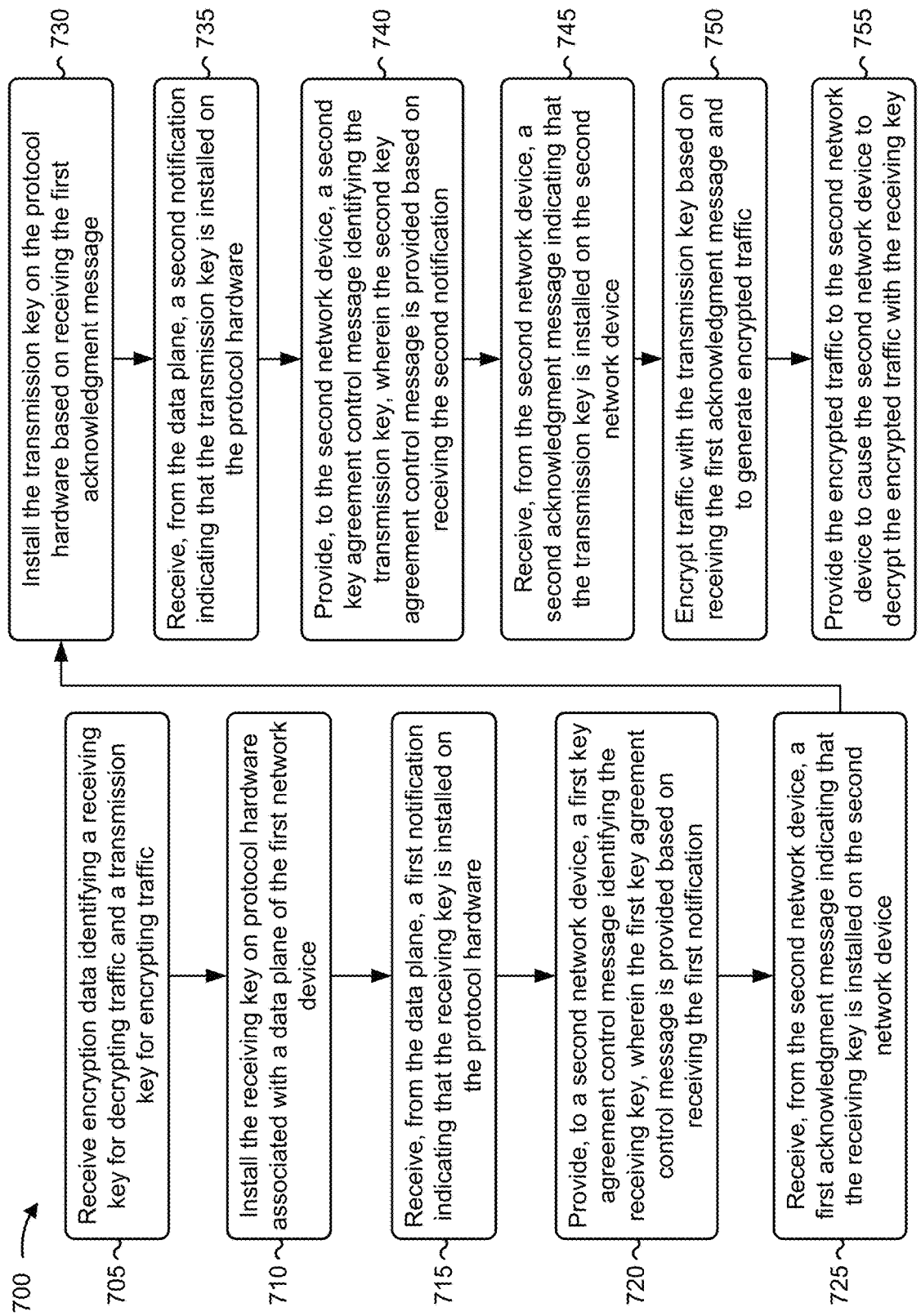

FIG. 7 is a flowchart of an example process 700 associated with facilitating hitless security key rollover for security keys. In some implementations, one or more process blocks of FIG. 7 may be performed by another device or a group of devices separate from or including the first network device, such as an endpoint device (e.g., endpoint device 210), and/or the like. Additionally, or alternatively, one or more process blocks of FIG. 7 may be performed by one or more components of a device 300, such as processor 320, memory 330, storage component 340, input component 350, output component 360, communication interface 370, and/or the like; and/or the like; one or more components of a device 400, such as input component 410, switching component 420, output component 430, controller 440, and/or the like; and/or the like.

As shown in FIG. 7, process 700 may include receiving encryption data identifying a receiving key for decrypting traffic and a transmission key for encrypting traffic (block 705). For example, the first network device may receive encryption data identifying a receiving key for decrypting traffic and a transmission key for encrypting traffic, as described above.

As further shown in FIG. 7, process 700 may include installing the receiving key on protocol hardware associated with a data plane of the first network device (block 710). For example, the first network device may install the receiving key on protocol hardware associated with a data plane of the first network device, as described above.

As further shown in FIG. 7, process 700 may include receiving, from the data plane, a first notification indicating that the receiving key is installed on the protocol hardware (block 715). For example, the first network device may receive, from the data plane, a first notification indicating that the receiving key is installed on the protocol hardware, as described above.

As further shown in FIG. 7, process 700 may include providing, to a second network device, a first key agreement control message identifying the receiving key, wherein the first key agreement control message is provided based on receiving the first notification (block 720). For example, the first network device may provide, to a second network device, a first key agreement control message identifying the receiving key, as described above. In some implementations, the first key agreement control message is provided based on receiving the first notification.

As further shown in FIG. 7, process 700 may include receiving, from the second network device, a first acknowledgment message indicating that the receiving key is installed on the second network device (block 725). For example, the first network device may receive, from the second network device, a first acknowledgment message indicating that the receiving key is installed on the second network device, as described above.

As further shown in FIG. 7, process 700 may include installing the transmission key on the protocol hardware based on receiving the first acknowledgment message (block 730). For example, the first network device may install the transmission key on the protocol hardware based on receiving the first acknowledgment message, as described above.

As further shown in FIG. 7, process 700 may include receiving, from the data plane, a second notification indicating that the transmission key is installed on the protocol hardware (block 735). For example, the first network device may receive, from the data plane, a second notification indicating that the transmission key is installed on the protocol hardware, as described above.

As further shown in FIG. 7, process 700 may include providing, to the second network device, a second key agreement control message identifying the transmission key, wherein the second key agreement control message is provided based on receiving the second notification (block 740). For example, the first network device may provide, to the second network device, a second key agreement control message identifying the transmission key, as described above. In some implementations, the second key agreement control message is provided based on receiving the second notification.

As further shown in FIG. 7, process 700 may include receiving, from the second network device, a second acknowledgment message indicating that the transmission key is installed on the second network device (block 745). For example, the first network device may receive, from the second network device, a second acknowledgment message indicating that the transmission key is installed on the second network device, as described above.

As further shown in FIG. 7, process 700 may include encrypt traffic with the transmission key based on receiving the first acknowledgment message and to generate encrypted traffic (block 750). For example, the first network device may encrypt traffic with the transmission key based on receiving the first acknowledgment message and to generate encrypted traffic, as described above.

As further shown in FIG. 7, process 700 may include providing the encrypted traffic to the second network device to cause the second network device to decrypt the encrypted traffic with the receiving key (block 755). For example, the first network device may provide the encrypted traffic to the second network device to cause the second network device to decrypt the encrypted traffic with the receiving key, as described above.

Process 700 may include additional implementations, such as any single implementation or any combination of implementations described below and/or in connection with one or more other processes described elsewhere herein.

In a first implementation, receiving the encryption data comprises receiving the encryption data identifying the receiving key and the transmission key a particular time period after receiving former security keys or after a quantity of packets is processed with the former security keys.

In a second implementation, alone or in combination with the first implementation, the first notification and the second notification enable the first network device to provide security key rollover with zero packet loss.

In a third implementation, alone or in combination with one or more of the first and second implementations, installing the receiving key on the protocol hardware includes programming the receiving key into the protocol hardware.

In a fourth implementation, alone or in combination with one or more of the first through third implementations, installing the transmission key on the protocol hardware based on receiving the first acknowledgment message includes programming the transmission key into the protocol hardware after receiving the first acknowledgment message.

In a fifth implementation, alone or in combination with one or more of the first through fourth implementations, the first acknowledgment message is based on a third notification indicating that the receiving key is installed on protocol hardware associated with a data plane of the second network device.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method comprising:
   installing, by a first network device, a transmission key on protocol hardware based on receiving an acknowledgment message indicating that a receiving key is installed on a second network device,
      wherein installing the transmission key on the protocol hardware is based on receiving a request for installation of the transmission key from the second network device;
   receiving, from a data plane of the first network device, a notification indicating that the transmission key is installed on the protocol hardware;
   providing, by the first network device and to the second network device and based on receiving the notification, a key agreement control message identifying the transmission key;
   encrypting, by the first network device, traffic with the transmission key based on receiving the acknowledgment message and to generate encrypted traffic; and
   providing, by the first network device, the encrypted traffic to the second network device for decrypting the encrypted traffic with the receiving key.

2. The method of claim 1, wherein providing the key agreement control message causes the second network device to install the transmission key.

3. The method of claim 1, further comprising:
   receiving, from the second network device, another notification indicating that the transmission key is installed on the second network device.

4. The method of claim 1, wherein installing the transmission key comprises:
   programming the transmission key into the protocol hardware.

5. The method of claim 1, wherein installing the transmission key comprises:
   communicating with a protocol daemon to cause the transmission key to be installed on the data plane of the first network device.

6. The method of claim 1, wherein the first network device includes a peer network device.

7. A non-transitory computer-readable medium storing a set of instructions, the set of instructions comprising:
   one or more instructions that, when executed by one or more processors of a first network device, cause the first network device to:
      install a transmission key on protocol hardware based on receiving an acknowledgment message indicating that a receiving key is installed on a second network device,
         wherein the one or more instructions, that cause the first network device to install the transmission key on the protocol hardware, cause the first network device to install the transmission key based on receiving a request for installation of the transmission key from the second network device;
      receive a notification indicating that the transmission key is installed on the protocol hardware;
      provide, to the second network device and based on receiving the notification, a key agreement control message identifying the transmission key;
      encrypt traffic with the transmission key based on receiving the acknowledgment message and to generate encrypted traffic; and
      provide the encrypted traffic to the second network device for decrypting the encrypted traffic with the receiving key.

8. The non-transitory computer-readable medium of claim 7, wherein the one or more instructions, that cause the first network device to provide the key agreement control message, cause the second network device to install the transmission key.

9. The non-transitory computer-readable medium of claim 7, wherein the one or more instructions further cause the first network device to:
   receive, from the second network device, another notification indicating that the transmission key is installed on the second network device.

10. The non-transitory computer-readable medium of claim 7, wherein the one or more instructions, that cause the first network device to install the transmission key, cause the first network device to:
    program the transmission key into the protocol hardware.

11. The non-transitory computer-readable medium of claim 7, wherein the one or more instructions, that cause the first network device to install the transmission key, cause the first network device to:
    communicate with a protocol daemon to cause the transmission key to be installed on a data plane of the first network device.

12. The non-transitory computer-readable medium of claim 7, wherein the first network device includes a peer network device.

13. A first network device, comprising:
    one or more memories; and
    one or more processors to:
       install a transmission key on protocol hardware based on receiving an acknowledgment message indicating that a receiving key is installed on a second network device,
          wherein the one or more processors, to install the transmission key on the protocol hardware, are configured to install the transmission key on the protocol hardware based on receiving a request for installation of the transmission key from the second network device;

receive, from a data plane of the first network device, a notification indicating that the transmission key is installed on the protocol hardware;

provide, to the second network device and based on receiving the notification, a key agreement control message identifying the transmission key;

encrypt traffic with the transmission key based on receiving the acknowledgment message and to generate encrypted traffic; and provide the encrypted traffic to the second network device for decrypting the encrypted traffic with the receiving key.

14. The first network device of claim 13, wherein the one or more processors, when providing the key agreement control message, causes the second network device to install the transmission key.

15. The first network device of claim 13, wherein the one or more processors are further to:

receive, from the second network device, another notification indicating that the transmission key is installed on the second network device.

16. The first network device of claim 13, wherein the one or more processors, to install the transmission key, are to:

program the transmission key into the protocol hardware.

17. The first network device of claim 13, wherein the one or more processors, to install the transmission key, are to:

communicate with a protocol daemon to cause the transmission key to be installed on the data plane of the first network device.

18. The method of claim 1, further comprising:

determining that the installation of the transmission key is complete.

19. The non-transitory computer-readable medium of claim 7, wherein the one or more instructions cause the one or more processors to:

determine that the installation of the transmission key is complete.

20. The first network device of claim 13, wherein the one or more processors are configured to:

determine that the installation of the transmission key is complete.

* * * * *